United States Patent [19]

Hamada et al.

[11] Patent Number: 5,724,350
[45] Date of Patent: Mar. 3, 1998

[54] DATA TRANSMISSION METHOD AND SYSTEM FOR HUB-BASED NETWORK

[75] Inventors: Takuji Hamada, Hitachiota; Norihiko Sugimoto, Katsuta; Kinshirou Oonishi; Shunji Inada, both of Hitachi; Yoshinori Ohkura, Mito; Katsuhiko Yoneda, Ibaraki-ken, all of Japan

[73] Assignee: Hitachi, Ltd., Tokyo, Japan

[21] Appl. No.: 489,475

[22] Filed: Jun. 12, 1995

Related U.S. Application Data

[63] Continuation of Ser. No. 49,292, Apr. 20, 1993.

[30] Foreign Application Priority Data

Apr. 22, 1992 [JP] Japan ................................. 4-102729

[51] Int. Cl.$^6$ ...................................................... H01J 3/14
[52] U.S. Cl. ........................ 370/392; 370/425; 370/426; 370/446; 370/447
[58] Field of Search ................................... 370/85.2, 85.3, 370/85.6, 85.7, 85.9, 92, 93, 94.1, 94.3, 351, 389, 390, 392, 400, 401, 402, 403, 404, 405, 406, 407, 422, 425, 423, 424, 428, 445, 446, 447, 449, 450, 451, 452, 454, 455, 461, 420, 421, 501, 522, 216, 229, 230, 239, 240, 426, 58.1, 60; 340/825.06, 825.07, 825.08, 825.52

[56] References Cited

U.S. PATENT DOCUMENTS

| | | | |
|---|---|---|---|
| 4,570,162 | 2/1986 | Boulton et al. | 370/93 |
| 4,998,247 | 3/1991 | Irvine-Halliday et al. | 370/85.6 |
| 5,041,963 | 8/1991 | Ebersole et al. | 370/94.1 |
| 5,140,585 | 8/1992 | Tomikawa | 370/94.3 |
| 5,351,241 | 9/1994 | Yehonatan | 370/85.3 |

*Primary Examiner*—Wellington Chin
*Assistant Examiner*—Huy D. Vu
*Attorney, Agent, or Firm*—Antonelli, Terry, Stout & Kraus, LLP

[57] ABSTRACT

A system for transmitting data in high precision by restricting a delay in data transmission time includes a hub. The hub receives through the transmission media a data frame transmitted from a communication device that has a transmission request among a plurality of communication devices, and relays the received data frame to a destination communication device based on a destination address included in the received data frame.

5 Claims, 12 Drawing Sheets

TOKEN

| P | S | F | E |
|---|---|---|---|
| A | D | C | D |

FRAME

| P | S | F | D | S | | | E | F |
|---|---|---|---|---|---|---|---|---|
| A | D | C | A | A | INFO | FCS | D | S |

P A : PREAMBLE
S D : STARTING DELIMITER
F C : FRAME CONTROL
E D : ENDING DELIMITER
D A : DESTINATION ADDRESS
S A : SOURCE ADDRESS
I N F O : INFORMATION DATA
F C S : FRAME CHECK SEQUENCE
F S : FRAME STATUS
A : ADDRESS-RECOGNIZED BITS
C : FRAME-COPIED BITS

A C - - A C - -

A C
0 0 ··· NON-ACTIVE STATION
0 1 ··· HUB SWITCHING COLLISION
1 0 ··· RECEIVING BUFFER BUSY
1 1 ··· FRAME RECEIVED

FRAME FORMAT (IEEE 802.3)

PRE : PREAMBLE

SFD : START FRAME DELIMITER

DA : DESTINATION ADDRESS

SA : SOURCE ADDRESS

LEN : FRAME LENGTH

INFO : INFORMATION DATA

FCS : FRAME CHECK SEQUENCE

DATA TRANSMISSION METHOD AND SYSTEM FOR HUB-BASED NETWORK

This is a continuation of application Ser. No. 08/049,292, filed Apr. 20, 1993.

BACKGROUND OF THE INVENTION

1. Field of the Invention

The present invention relates to a method for transmitting data in a hub-based local area network (LAN), and more particularly to a data transmission method suitable for improving the transmission performance of the LAN as a whole in a simple method.

2. Description of the Related Art

In order to improve the transmission performance of the network, there has so far been a hub-based network directly accommodating a plurality of local area network communication devices in a hub through transmission lines. A hub-based network using a hub called a multiport bridge or a multiport router is reported in, for example, "Bridges and Routers", IEEE Network, Vol. 2, No. 1, January, 1988, pp. 57–64, by William M. Seifert.

Usually, a bridge or a router is used to connect between LANs to enable each LAN to independently transmit packet information, unlike repeaters that have only a signal relaying function. By referring to a destination address of packet information that has been received by a bridge or a router, a LAN decides whether this information should be discarded or retransmitted (a filtering function). In the latter case, that is, when the destination address is not the address of a communication device connected to the LAN of a receiving port, the packet information is retransmitted to another port which requires this information (a forwarding function). As compared with a single LAN system, this method enables a traffic to be limited to a necessary place to thereby increase the traffic volume of the system as a whole, as described above.

As is clear from the above explanation, it can be considered that packet information is burst-switched in a multiport bridge or router that enables a mutual connection between a large number of LANs.

There are examples of a network for integratingly switching both packet information and isochronous information, as described in "An Integrated PBX/LAN System Architecture", IEEE ICC, June, 1988, pp. 1533–1538, by Eiichi Amada, et al. and "IVD-LAN Having Reached a Stage of Practical Development" (in Japanese), Computer & Network LAN, September, 1990, pp. 11–16, by Shimizu.

In the above-described example, a communication device of a local area network such as an Ethernet is converted into an IEEE802.9 IVD-LAN (Integrated Voice & Data LAN) interface by a terminal adaptor and is accommodated in a central switching unit, where the packet information is switched by a burst switching unit and the line information is switched by a Private Branch Exchange (PBX) unit.

According to the above-described conventional technique, there have been problems that, when a communication device of each local area network has transmitted packet information, it is not possible to directly confirm whether or not the packet information transmitted has reached another communication device that should receive the packet information, and a loss of packet information could easily occur when the information is switched integrally.

Further, according to the conventional technique, packet information is stored in the hub. The hub receives packet information on behalf of the communication device which should receive the information and stores the packet information in the buffer memory thereof as long as there is room in the buffer memory at the forwarding time. Therefore, there has also been a problem that there is a large time variation in the period from when the packet information is transmitted till when it reaches the communication device that should receive the information, taking much time in retransmitting the received package information.

SUMMARY OF THE INVENTION

It is an object of the present invention to provide a highly reliable method that can prevent delay in data transmission time and a data transmission system with a hub for the same.

In order to achieve the above object, according to the method for transmitting data in the network in which a plurality of communication devices are connected to each other through a hub, the hub receives, through transmission media, data frames transmitted from a communication device having a transmission request among the plurality of communication devices, and relays the received data frames to a destination communication device based on the destination address included in the received data frames.

Further, according to the method for transmitting data in the network in which a plurality of communication devices are connected to each other through a hub, the hub receives, through transmission media, a data frame transmitted from a communication device having a transmission request among the plurality of communication devices, decides a communication device to which the data frame is to be transmitted based on the destination address included in the received data frame and relays the received data frame to the destination communication device, and the destination communication device that has received the data frame transmits a message indicating that the data frames have been received, through the transmission media to a source communication device which transmitted the data frame.

Further, according to the data transmission system for transmitting and receiving data between a plurality of communication devices through a hub in the network in which the plurality of communication devices are connected through the hub, the hub has a data transmission control unit which receives data frames that have been transmitted from the plurality of communication devices, decides a destination communication device based on the destination address included in the received data frames and relays the received data frames to transmission media to which the decided destination communication device is being connected.

Data frames transmitted from a communication device reach the hub, and the hub decides a communication device to which the data frames should be transmitted based on the destination address included in the data frames that arrived and relays the data frames to the transmission media to which this destination communication device is being connected. Thus, this method makes it possible to transmit data with high transmission efficiency with minimum delay in transmission time.

Further, data frames transmitted from the communication device are received by the hub through transmission media, and the hub decides a destination communication device to which the data frames should be transmitted, based on the destination address included in the received data frames. The received data frames are then relayed to transmission media to which this decided destination communication device is being connected. The destination communication device that has received the relayed data frames transmits a message that the data frames have been received, through the transmission media to the communication device that transmitted the data frames. With this arrangement, the communication device which transmitted the data frames to the destination communication device can easily confirm whether or not the data frames have reached the destination communication device.

Further, the data transmission control unit provided within the hub receives data frames transmitted from a communication device having a transmission request among the plurality of communication devices, decides a communication device to which the data frames should be relayed, based on the destination address included in the received data frames, and relays the data frames to transmission media to which the decided destination communication device is being connected. Thus, with this arrangement, it is not necessary to temporarily store the data frames in the buffer memory within the hub when relaying the data frames, and therefore the hub itself can be made compact and a delay in the transmission time can be minimized.

DESCRIPTION OF THE PREFERRED EMBODIMENTS

Embodiments of the present invention will be explained below with reference to the drawings.

Figure 1:
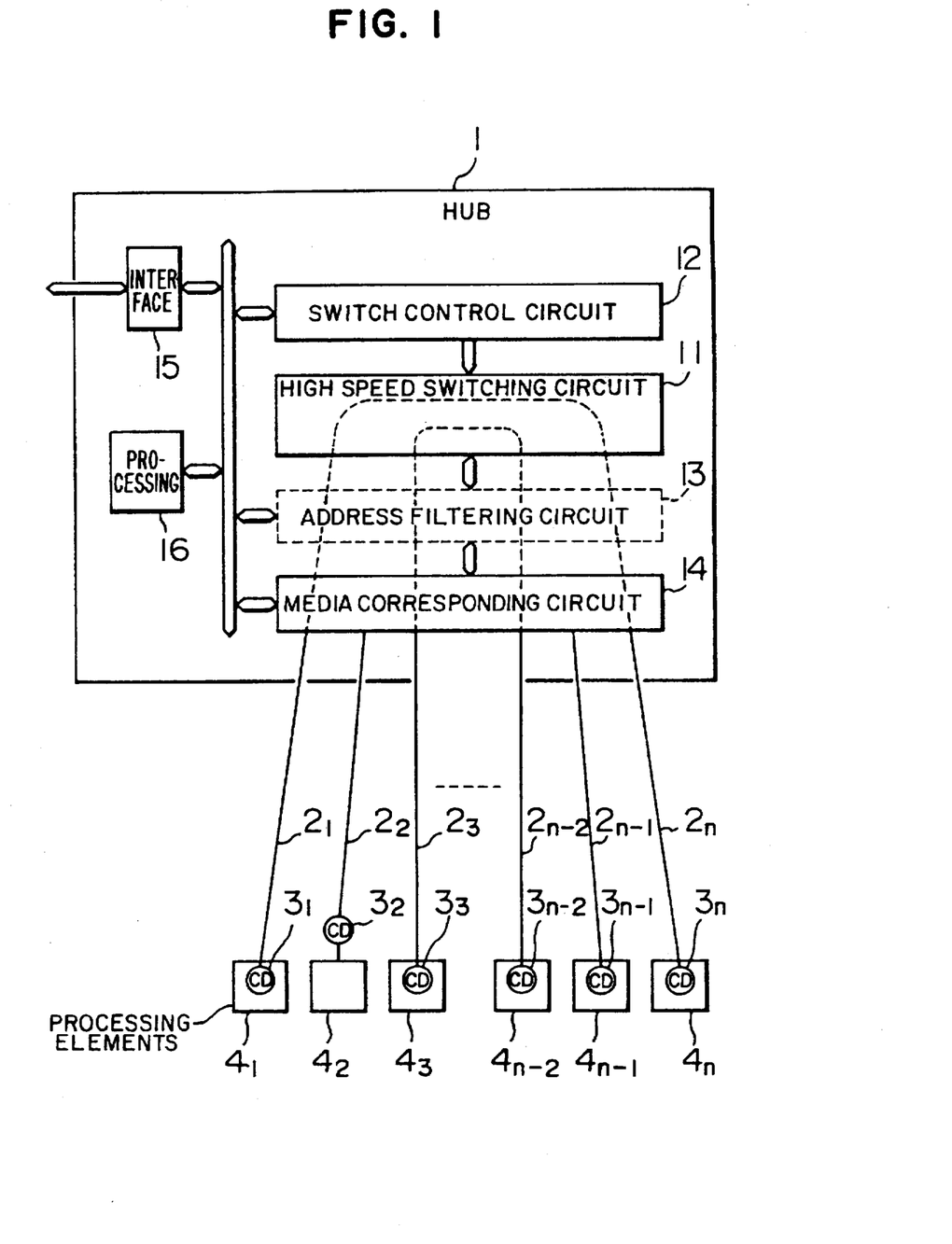
FIG. 1 is a configuration diagram of the hub-based network according to one embodiment of the present invention.

FIG. 1 shows the overall configuration of the hub-based network to which the present invention is applied.

Referring to FIG. 1, 1 designates a hub, $2_1$ to $2_n$ transmission media, $3_1$ to $3_n$ local area network (LAN) communication devices, and $4_1$ to $4_n$ processing elements. Various kinds of processing elements $4_1$ to $4_n$, such as mainframe or mini-computers, work stations, personal computers, etc., which are distributed in various regions are connected to the hub 1 through the transmission media $2_1$ to $2_n$, to form a star topology network which enables these processing elements to mutually exchange information. The LAN communication devices $3_1$ to $3_n$ may be installed within the processing elements $4_1$ to $4_n$ or installed outside these processing elements, depending on the situation.

Those processing elements having a LAN interface can, in principle, be connected to each other without the hub. However, the network employs the hub, for the following advantages: 1. expansion of coverage area, 2. easiness of maintenance and management, 3. easiness of wiring (sharing with a telephone service), and 4. increase in network throughput. Networks using hubs and wiring concentrators such as IEEE802.3 10BASE-T, IEEE802.5 TOKEN RING, and ANSI FDDI, etc. have the advantages 1., 2. and 3. above. The advantage of 4. above can be realized by the centralized switching network that has a multiport bridge, router or IVD-LAN interface. This effect can be obtained because a simultaneous transmission by a plurality of communication devices is made possible (between $3_1$ and $3_n$ and between $3_3$ and $3_{n-2}$ in the case of FIG. 1) as is apparent from the transmission media indicated by dotted lines within the hub 1 in FIG. 1. Thus, it becomes possible to increase the total network throughput to a higher level than a network throughput on the basis of the transmission speed of individual transmission media. On the other hand, according to a usual shared media type LAN that has no switching hub, only one communication device can transmit data at one time.

According to the present invention, the switching operation can be achieved by a real time switching utilizing the media access control of the LAN, in stead of a stored type packet switching as realized by the above-described conventional technique. Because of the above arrangement, a large amount of packet information can not only be transmitted in simply but also be easily executed in real time.

The hub to achieve the above function is structured by the following circuits.

1. a high speed switching circuit 11

This circuit executes switching, multiplexing, separating and changing over. In a case of circuit witching, a cross connect switch and an ATM (asynchronous transfer mode) cell switch can be used, and in a case of packet switching, a normal space switch can be used.

2. switch control circuit 12

This circuit despatches an operation instruction to the high speed switching circuit 11. In a case of circuit switching, this is controlled by a manual setting or a calling demand transmitted from a processing element. On the other hand, in a case of packet switching, the next switching condition is decided based on both the destination information included in the received packet and the current condition.

3. address filtering circuit 13

This circuit is added when packet switching is executed by the hub. The address filtering circuit executes for each line the functional operation of the media access layer of the LAN, and executes mainly the address filtering. The operation includes the recognizing of addresses of the communication devices connected to the individual transmission media and finding output transmission media from the destination information included in the received packet. The address recognition can be carried out based on any one of a manual setting, a transmission instruction sent from a processing element and automatic learning of source address information included in the received packet.

4. media corresponding circuit 14

This circuit executes for each line the physical layer function of the LAN, such as transmitting and receiving of signals and timing extraction.

5. man-machine interface circuit 15

This circuit displays the states of various circuits within the hub to the external units as network management or conversely provides various manual setting means to the hub.

6. transmission processing circuit 16

This circuit executes control and management of the hub as a whole. The circuit can transfer information to each communication device through the media corresponding circuit 14.

FIG. 1 shows an example of the case where one hub is used. It is needless to mention that a network using a plurality of hubs can also be structured according to the present invention.

While the effect shown in FIG. 1 is the increase of network throughout, there are also the following effects of the present embodiment.

1. variety of network formats

In addition to the conventional ring and bus network configurations, star and mesh configurations or other combination is possible.

2. accommodation of transmission circuits of different speeds

In a case of circuit switching or multiplexing or demultiplexing in the hub, the speeds of multiplexed transmission media need not be the same. However, in a case of carrying out packet switching in the hub, it is desirable that all the packet transmission channels are the same, as in the normal shared media type LAN.

This will be explained below.

Figure 2:
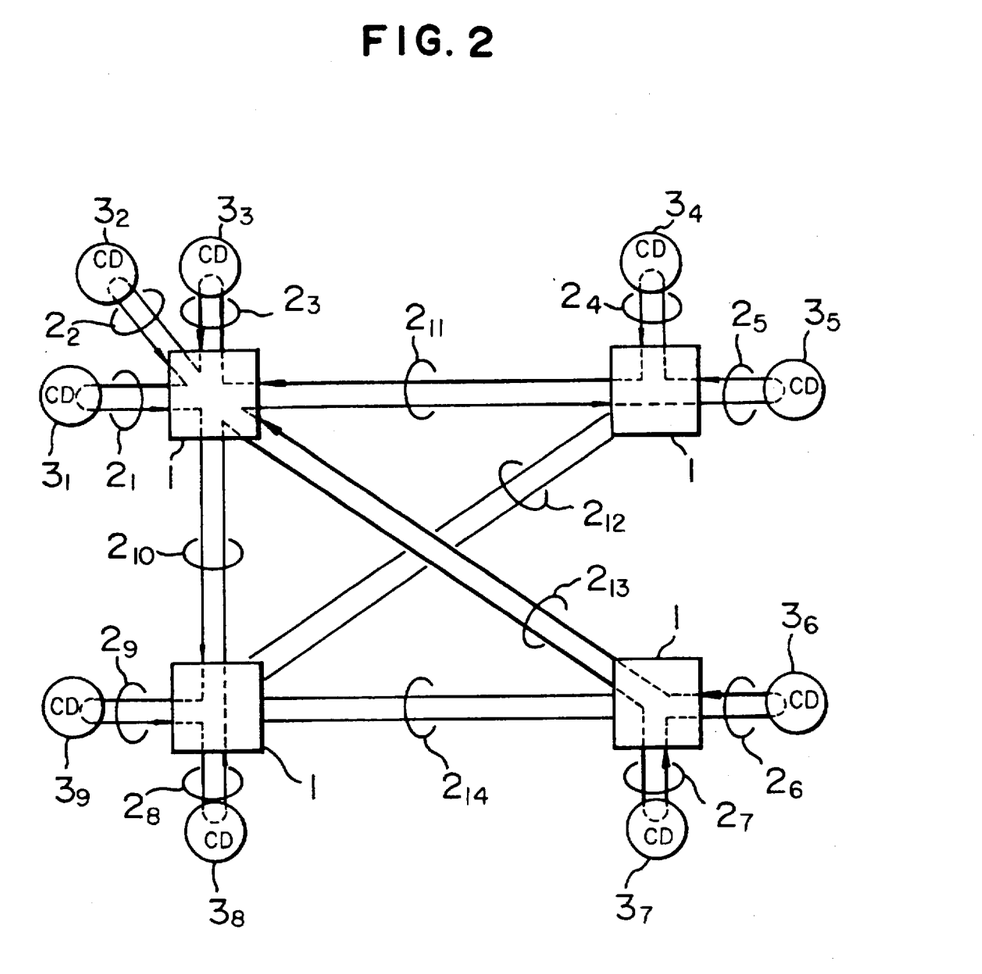
FIG. 2 is a configuration diagram of the hub-based network having a plurality of hubs.

FIG. 2 shows an example of a network of ring configuration in logical but a network of star and mesh hybrid configuration in physical. In this configuration, redundant transmission routes exist in the trunk part and hence rerouting can be taken in a case of a fault occurrence. Also, a fault area can be easily separated at a branch part, so that a highly reliable network which prevents the fault from diffusing to the whole system can be provided. Transmission routes shown in thick lines may have transmission speeds different from those of the transmission routes shown in thin lines. For example, in a case of a wide band digital/video transmission in the circuit switching configuration, the routes can be so set that the information flows not through the whole ring but through only the necessary paths. Therefore, the total network throughput can be increased by preventing the routes from being mutually duplicated. Conversely, a low speed circuit can be utilized in the route of small traffic, which provides cost advantage.

Figure 3:
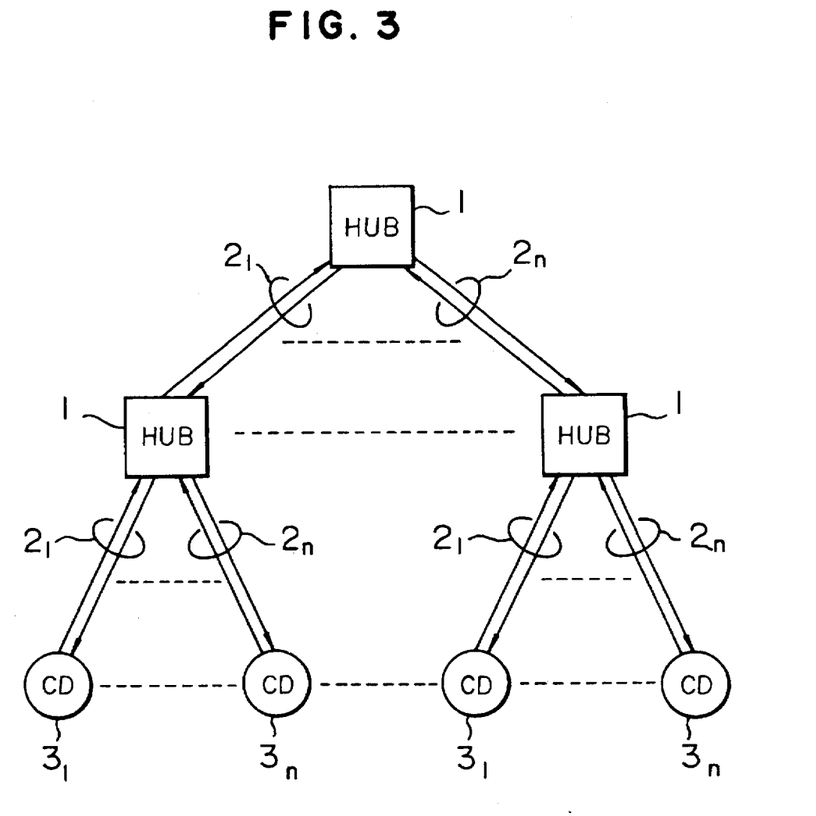
FIG. 3 is a configuration diagram of the hub-based bus network having a plurality of hubs.

FIG. 3 shows an example of a bus type network having multi-stage star configuration, which is well known in the IEEE802.3 and 10BASE-T. This is a network which enables each communication device to transmit isochronous information to all the other communication devices. Information to be transmitted by each communication device is collected to the hub at the top of the drawing and is finally transmitted to all the communication devices. In such transmission configuration as shown in this drawing, the upward paths shown in the lower stage of the drawing may have slower speed than that of the downward paths. Further, a distributed type packet switching can also be realized simultaneously, in the same manner as the 10BASE-T, if a packet channel for multiplexed packet information is relayed in the hub.

Figure 4:
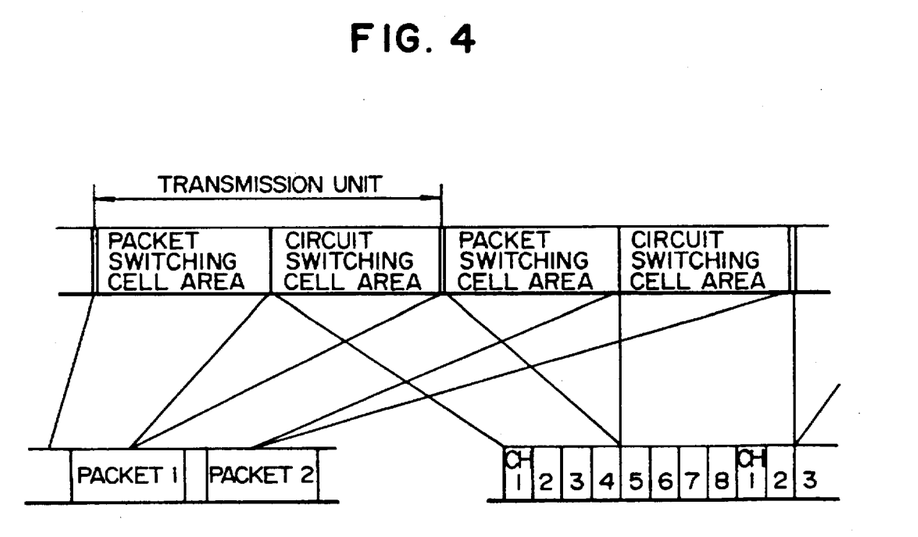
FIG. 4 is a diagram for showing a transmission format of the packet and circuit switching hybrid LAN.

FIG. 4 shows an example of a transmission format in the hybrid LAN in which packet switching and circuit switching exist together. This type of transmission format is employed in many cases by the multi-media type LAN in which various kinds of media information such as voice, data and images are accommodated together. Data, including still image information, is generated in a burst manner and line hold time is short. On the other hand, voice and image, particularly digitalized dynamic image information is generated in a stream or periodic manner, and line hold time is long. Thus, it is desirable that switching systems are separate for information of different traffic characteristics. Usually, packet switching is suitable for main frame data and circuit switching is suitable for digitalized voice and images. In the present example, a format is shown for the case where the above-described two kinds of information coexist in time division and separate information is multiplexed and transmitted by the communication device at the processing element side. There are other ways of multiplexing such as space division multiplexing (separate transmission lines), frequency division multiplexing, wave length division multiplexing, etc., and the present invention can be applied to any one of these.

Figure 5:
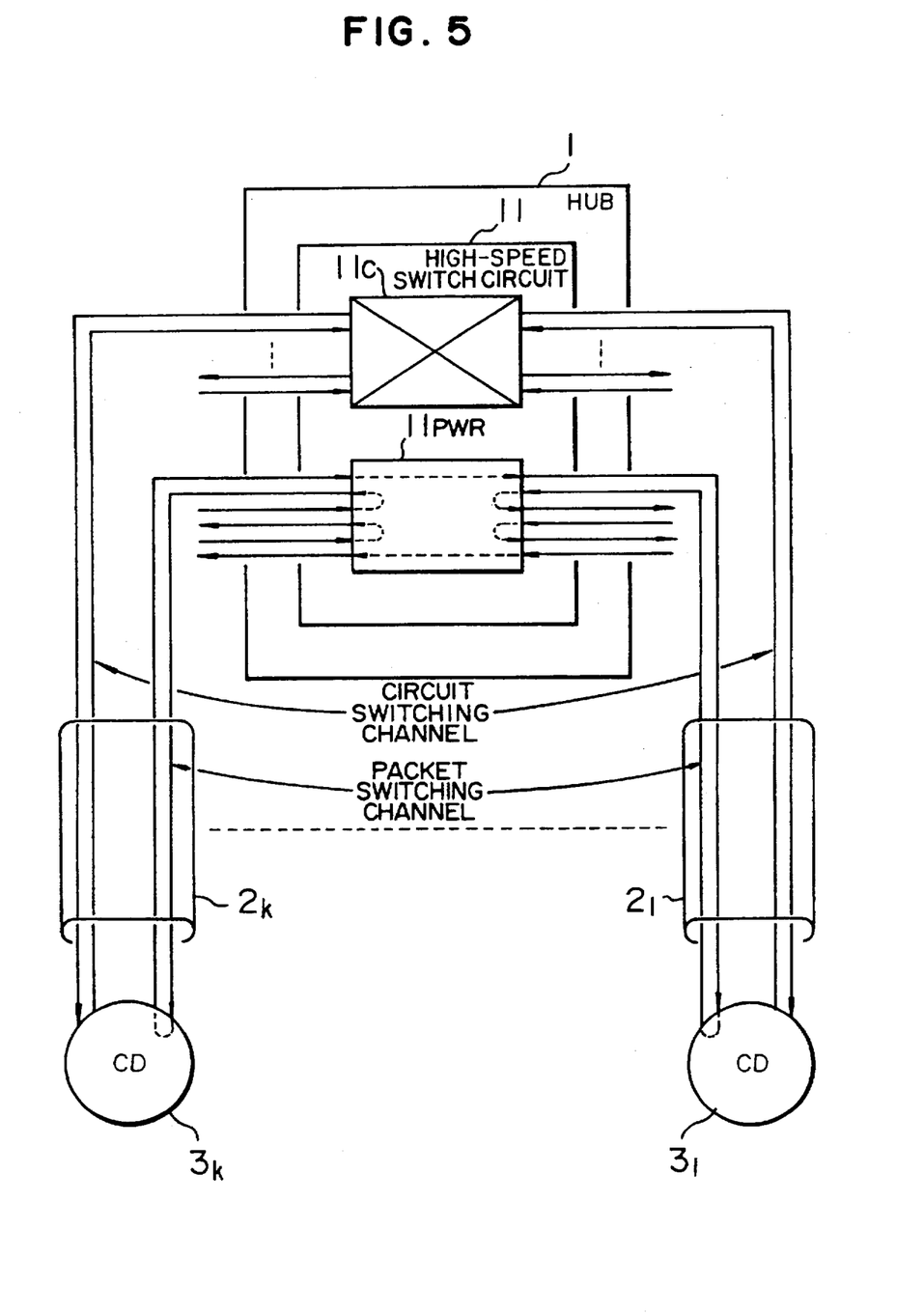
FIG. 5 is a configuration diagram of the ring network in which packet switching is not carried out by a hub.

FIG. 5 shows an example of the hub-based ring network for executing only circuit switching by the hub in FIG. 2. This configuration is effective in the case where information of which network throughput to be increased is only circuit switching information such as image information. As shown in FIG. 5, of the multiplexed information, circuit switching information is switched by a circuit 11c within a high-speed switch circuit 11 in the hub, and packet switching information is only $11_{PWR}$ that is wired in a ring shape in the hub. The packet information is distributedly switched by media access control (token passing or slotted access) of a communication device 3. Therefore, information loss that may occur at the time of switching packet information integratingly can be easily prevented.

Figure 6:
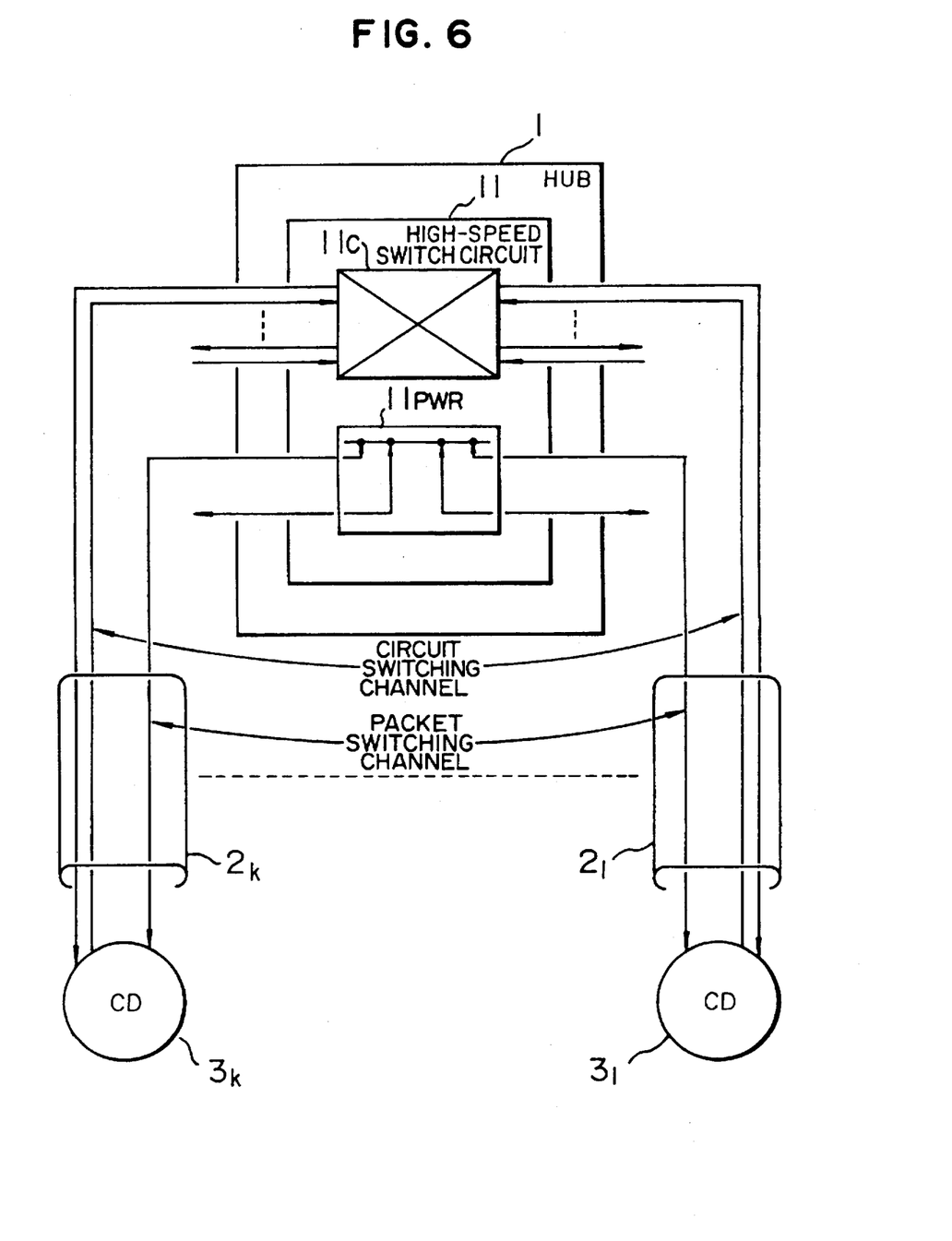
FIG. 6 is a configuration diagram of the bus network in which packet switching is not carried out by a hub.

FIG. 6 shows a hub-based or bus network for executing only circuit switching by a main hub in FIG. 3. In the same manner as the example of FIG. 5, the circuit switching channel is switched or multiplexed or demultiplexd by a circuit 11c but the transmission channel of the packet switching information is connected to structure a bus as shown by $11_{PWB}$ and is therefore distributedly switched by the Carrier Sense Multiple Access with Collision Detection (CSMA/CD) held by the communication device side.

Figure 7:
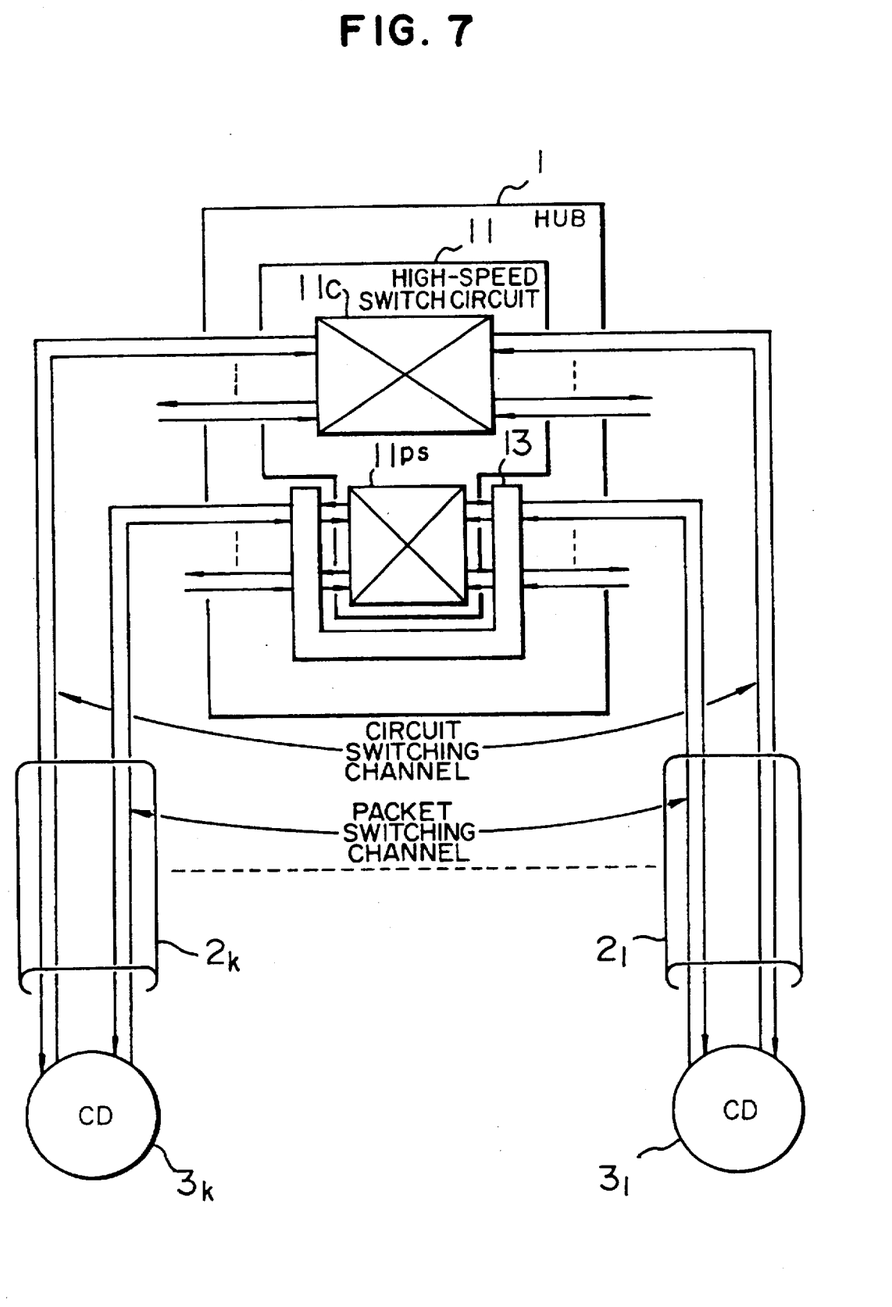
FIG. 7 is a configuration diagram of the hub-based network in which packet switching is carried out by a hub.

FIG. 7 shows an example of the configuration of the hub-based network for executing both packet switching and circuit switching by a concentrator. In the present example, transmission channels of both packet and circuit switching information are switched by a high-speed circuit 11. An address filter circuit 13 becomes necessary for the packet switching executed by $11_{PS}$. For the centralized switching of the packet information, stored type-packet switching employed in the conventional system is not used but media access control function held by each communication device is utilized to achieve a real time switching in high throughput without packet storage. This will be explained in detail.

Figure 8:
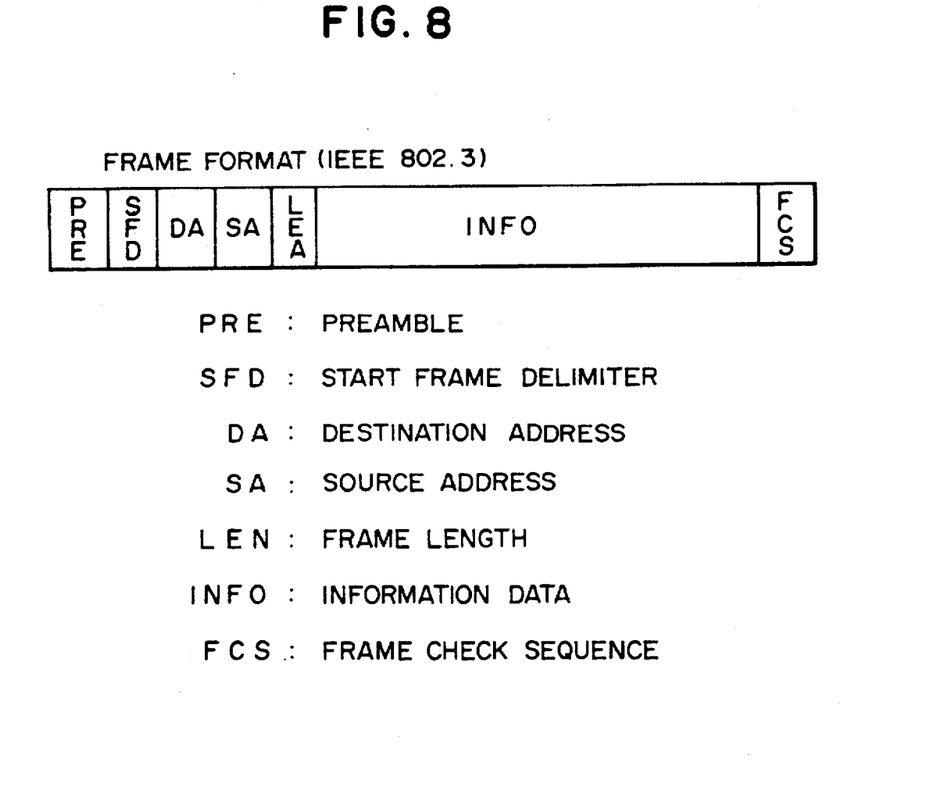
FIG. 8 is a diagram for showing the transmission format of the bus type LAN.

FIG. 8 shows a transmission format of packet information for the case where media access control function of each communication device is the CSMA/CD which is the international standard of the bus type LAN. Each field has been defined as follows.

Preamble (PRE) makes a media corresponding circuit prepare receiving of the frame information.

Start Frame Delimiter (SFD) posts the address filtering circuit of the arrival of the header of the frame.

Destination Address (DA) is checked by the address filtering circuit within the hub and is used to decide an output circuit of the high-speed switching circuit to which this frame is to be outputted.

Source Address (SA) is used by the address filtering circuit to automatically learn the transmission media to which each communication device is connected.

Frame Length (LEN) is used to check a frame error.

Information data (INFO) is transferred to the transmission processing circuit 16 shown in FIG. 1 only when the frame is destined to the hub, and the content is interpreted.

Frame Check Sequence (FCS) is used together with the Frame Length (LEN) to check a frame error.

Figure 9:
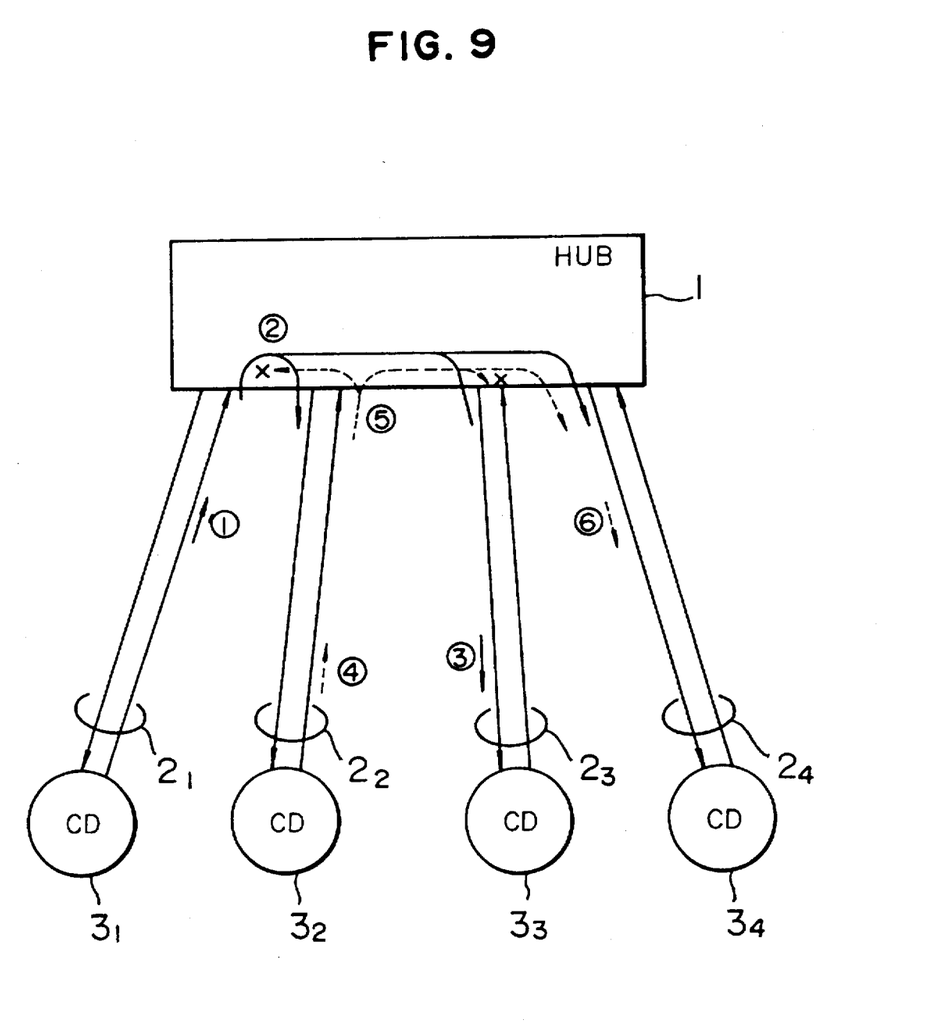
FIG. 9 is a diagram for showing an example of data transmission in the bus network of hub-based packet switching.

FIG. 9 shows a switching operation in the hub-based packet switching bus network. In this example, the LAN communication device $3_1$ and the LAN communication device $3_2$ transmit individual packets (frames) to $3_3$ and $3_4$ respectively at the same time, which shows a typical example of the characteristics of the network that a large network throughput can be realized.

The operation flow is as follows.

1. The communication device $3_1$ from which a transmission request was sent detects an empty or a non-carrier state of the receiving circuit and then transmits a packet, as shown by ① in FIG. 9.
2. The concentrator detects a preamble from the communication device $3_1$ and relays this to all the empty output circuits, other than the own device, which are not being used for transmission or receiving. This relaying is continued until when the destination address reaches the concentrator and the output circuit to be used is decided.

As an alternative, if the system scale limit can permit, the hub keeps storing the preamble until when the output circuit is decided based on the destination address of the arriving packet, and omits relaying unnecessary information, as shown by ② in FIG. 9.

3. When it is made clear from the destination address that has arrived that the packet is to be transmitted to $3_3$, the relaying from $3_1$ is limited to only the output circuit destined to $3_3$. The communication devices $3_2$ and $3_4$ receive only the header portion of the packet transmitted from the communication device $3_1$ but this is disregarded by each communication device. The communication device $3_3$ can receive all the packets transmitted from $3_1$, as shown by ③ in FIG. 9.
4. During the continuation of packet transfer from $3_1$ to $3_3$, a request for a packet transmission to $3_4$ occurs in $3_2$, and the communication device $3_2$ detects an empty state of the receiving circuit and immediately starts the packet transmission, as shown by ④ in FIG. 9.
5. Since the hub has detected the preamble from the communication device $3_2$, this is attempted to be relayed to empty circuits. Since $3_1$ and $3_3$ are in the middle of transmission in this example, the preamble is transmitted to only $3_4$, as shown by ⑤ in FIG. 9.
6. The communication device $3_4$ receives the packet from $3_2$, as shown by ⑥ in FIG. 9.

As explained above, according to the present network, a plurality of communication devices can transmit packets simultaneously so that the total network throughput can be increased.

Figure 10:
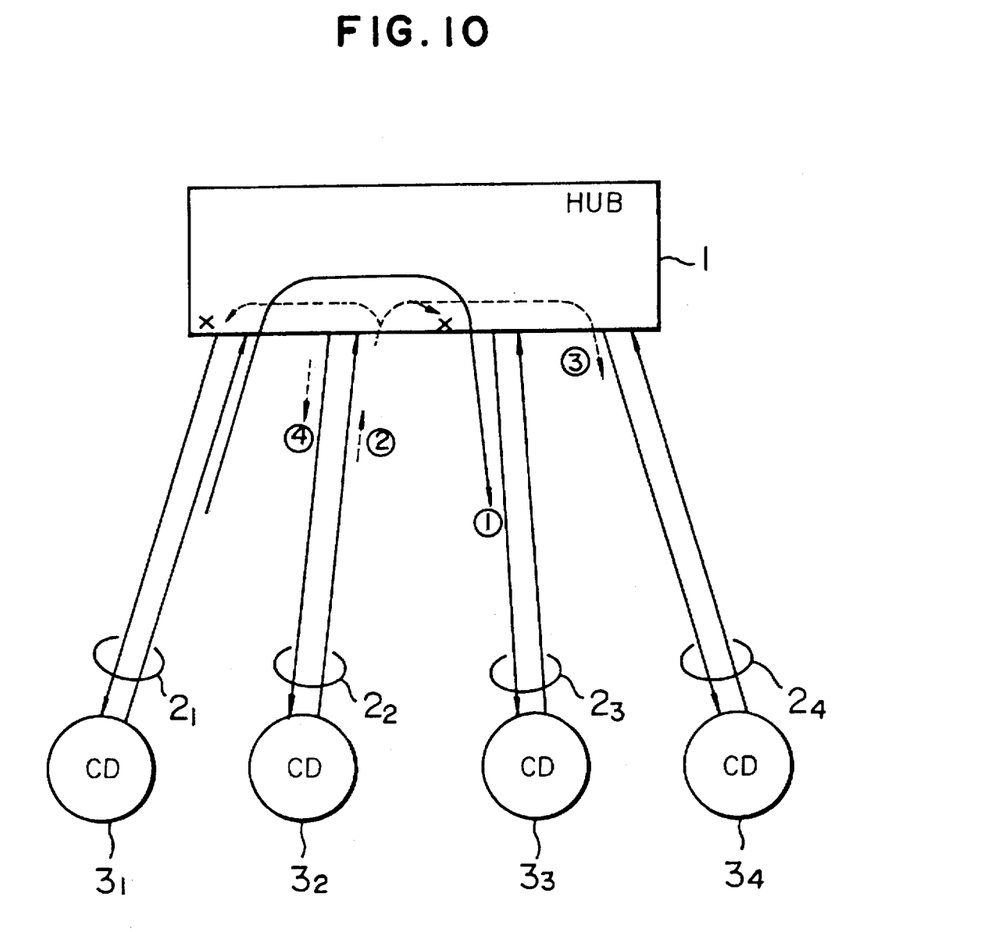
FIG. 10 is a diagram for showing an example of data transmission when a collision has occurred in the bus network of hub-based packet switching.

FIG. 10 shows an example of the operation of the case where there occurred a plurality of requests for transmitting packets to a destination of the same communication device, unlike the case of FIG. 9. In this example, the communication devices $3_1$ and $3_2$ request the transmission to $3_3$.

1. In the procedure similar to the one in the case of FIG. 9, the communication device $3_1$ first starts transmission to $3_3$. When preambles have reached the hub from a plurality of communication devices at the same time, an occurrence of a collision is transmitted to all the communication devices in the same manner as the repeater, and urges the retransmission of the packets, as shown by ① in FIG. 10.
2. The communication device $3_2$ starts transmitting the packet to the circuit which has been found empty, as shown by ② in FIG. 10.
3. The hub which has detected the preamble from the communication device $3_2$ relays this to all the empty circuits. Since the empty circuit is $3_4$ only, the preamble is transmitted to this circuit, as shown by ③ in FIG. 10.
4. When the destination address of the packet transmitted from the communication device $3_2$ has reached the hub and the output circuit is known to be the one destined to $3_3$ which is currently being used, an occurrence of a collision is noticed to $3_2$, and urges a retransmission of the packet. $3_2$ recognizes a failure of the transmission upon receiving this notice and immediately stops the transmission and retransmits the packet after a predetermined time, as shown by ④ in FIG. 10.

Figure 11:
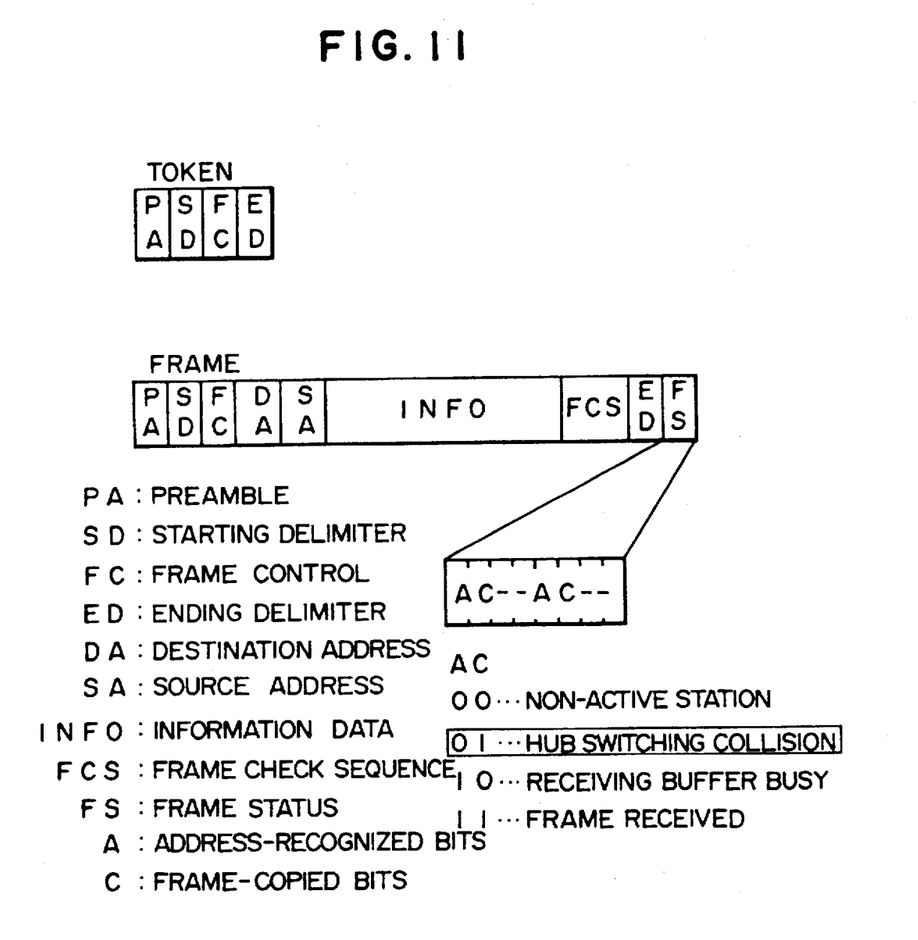
FIG. 11 is a diagram for showing the transmission format of the ring type LAN.

FIG. 11 shows a transmission format of packet information for the case where each communication device employs token ring media access control which is an international standard of the ring type LAN. The Fiber Distributed Data Interface (FDDI) also has almost the similar format, and therefore, this will also be explained together. The setting of each field is as follows.

Preamble (PA) posts the arrival of information to the address filtering circuit 13 shown in FIG. 1.

Starting Delimiter (SD) posts the header of information to the circuit.

Frame Control (FC) instructs whether the information is token (free/busy) or frame.

Ending Delimiter (ED) posts the end of information.

Destination Address (DA) is checked by the address filtering circuit 13 shown in FIG. 1 and is used to decide an output circuit to which the frame is to be outputted.

Source Address (SA) is used by the address filtering circuit 13 shown in FIG. 1 to automatically learn the transmission media to which each communication device is connected.

Information Data (INFO) is transferred to the transmission processing circuit 16 shown in FIG. 1 only when the frame is destined to the hub, and the content is interpreted.

Frame Check Sequence (FCS) is used to detect a transmission error which occurred in the received frame.

Frame Status (FS) is used for a receiving communication device to post a frame receiving condition to a transmitting communication device. There are two types, that is, Address-recognized bits (A) and Frame-copied bits (C), and they have the following meanings depending on different combinations.

| A | C | |
|---|---|---|
| 0 | 0 | no receiving communication device |
| 1 | 0 | receiving communication device is busy |
| 1 | 1 | normal receiving |
| 0 | 1 | failure in switching by the hub |

The last combination (0 1) was undefined according to the conventional LAN and this has been newly defined to apply the present invention.

Figure 12:
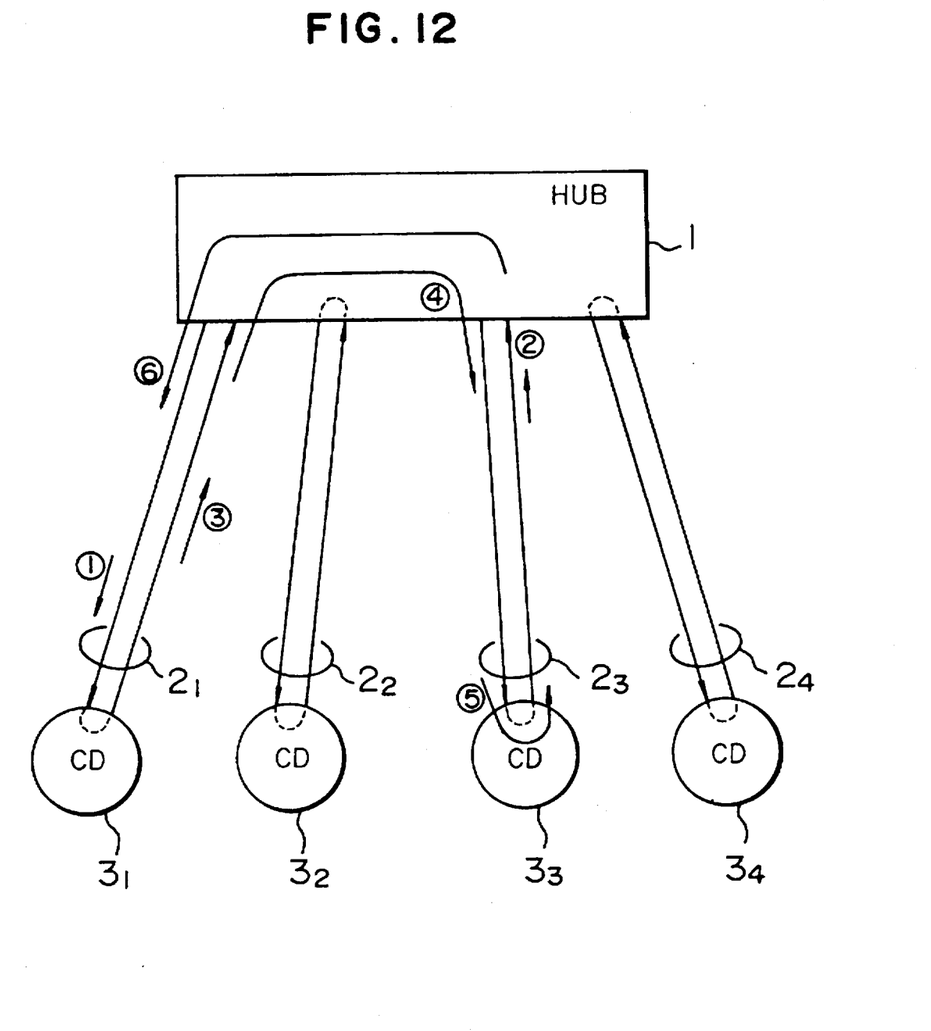
FIG. 12 is a diagram for showing an example of data transmission in the ring network of hub-based packet switching.

FIG. 12 shows a switching operation of the hub-based packet switching ring network. The same example as that of FIG. 9 will be explained below.

The operation flow is as follows.

1. The communication device $3_1$ in which a request for a transmission destined to the communication device $3_3$ occurred obtains a free token and then transmits a packet (frame), as shown by ① in FIG. 12.
2. The hub 1 receives the free token in the loop transmission media which connects the communication device $3_3$ and stores this for a predetermined period, as shown by ② in FIG. 12.
3. The hub 1 detects the arrival of the packet from the communication device $3_1$, and keeps storing the information until an output circuit has been detected from a destination address to be received, as shown by ③ in FIG. 12.
4. The hub 1 receives the destination address of the packet and detects that the output circuit is destined to the communication device $3_3$ and also detects that the free token of the loop transmission media exists in the hub 1, so that the loops of $3_1$ and $3_3$ are combined to form one loop, as shown by ④ in FIG. 12.
5. The packet from the communication device $3_1$ reaches the communication device $3_3$ via the hub 1 and is received by the communication device $3_3$. The communication device $3_3$ writes a response in the frame status FS. This information is relayed to the hub 1 again, as shown by ⑤ in FIG. 12.
6. The packet information returned from the communication device $3_3$ is returned to the communication device $3_1$ and the communication device $3_1$ receives this packet information. The hub 1 separates the ring between the communication devices $3_1$ and $3_3$ and structures each individual ring transmission media again, as shown by ⑥ in FIG. 12.

As is clear from the above explanation, according to the present invention, while a ring is being formed between $3_2$ and $3_4$ other ring can also be formed at the same time, such as between $3_2$ and $3_3$, so that the total network throughput can be increased as is the case with the above-described hub-based bus network.

Figure 13:
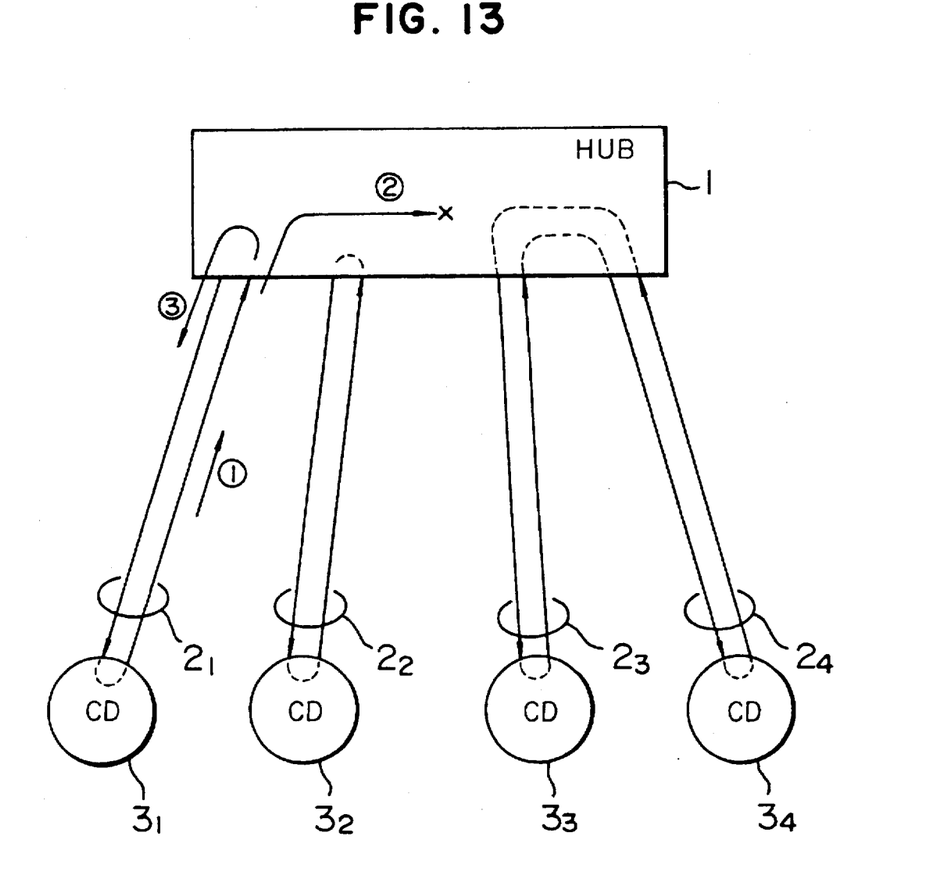
FIG. 13 is a diagram for showing an example of data transmission when a collision has occurred in the ring network of hub-based packet switching.

FIG. 13 is an example of the operation for the case where a request has occurred for transmitting a packet destined to the communication device which has already started a transmission. In this example, a request occurred for transmission from $3_1$ to $3_3$.

1. The communication device $3_1$ starts transmitting the packet destined to $3_3$, in the manner similar to the above example, as shown by ① in FIG. 13.
2. The hub 1 receives the packet and detects from the destination address that the packet is destined to the communication device $3_3$, and then detects that the ring transmission media to which the communication device $3_3$ is connected is busy, that is the communication device $3_3$ is already in the middle of communications with the other communication device or the free token in the ring transmission media is not held in the hub, as shown by ② in FIG. 13.
3. The hub 1 urges the transmitting communication device $3_1$ to retransmit the packet by writing in the frame status which returns to the communication device $3_1$ (A=0, C=1).

The communication device $3_1$ recognizes a failure of the transmission and retransmits the packet after a predetermined period, as shown by ③ in FIG. 13.

As is clear from the above explanation, according to the present embodiment, the effect similar to the one obtained by the above-described hub-based bus network can also be obtained.

According to the present invention, it is possible to reduce delay in the data transmission time in the data transmission system, and further it is possible to make a compact structure of the hub within the data transmission system.

What is claimed is:

1. A method for transmitting data in a hub-based network to which a plurality of communication devices are connected through a hub in accordance with a communication based on a protocol of CSMA/CD (Carrier Sense Multiple Access with Collision Detection), comprising the steps of:

receiving by said hub, through transmission lines, a plurality of data frames transmitted from said communication devices, said data frames each having a transmission request from a communication device;

detecting a destination communication device for each of said data frames to be relayed based on a destination address in said each data frame;

when a plurality of said communication devices have transmission requests for transmitting data to a same destination communication device, relaying by said hub, a data frame from one communication device of said plurality of said communication devices to said same destination communication device; and posting, by said hub, a collision signal based on said protocol of CSMA/CD added to each of said data frames transmitted from said communication devices other than said one communication device, to said communication devices other than said one communication device for requesting retransmission of data frames other than said data frame from said one communication device when transmission to said same destination communication device is being occupied by said one communication device.

2. A method for transmitting data in a hub-based network to which a plurality of communication devices are connected to each other by a plurality of ring-type LAN's connected through a hub in accordance with a communication based on said ring-type LAN's, comprising the steps of:

detecting a destination communication device for each of a plurality of data frames received by said hub based on a destination address in said each data frame, said each data frame having a transmission request from a communication device;

when a plurality of said communication devices have transmission requests for transmitting data to a same destination communication device, relaying by said hub, a data frame from one communication device of said plurality of said communication devices to said same destination communication device;

posting, by said hub, an indication, added to each of said data frames transmitted from said communication devices other than said one communication device, that a failure in switching by the hub has occurred, to said communication devices other than said one communication device for requesting retransmission of said data frames other than said data frame from said one communication device when transmission to said same destination communication device is being occupied by said one communication device; and starting by the other communication devices transmitting of the said data frames other than said data frame from said one communication device again after a predetermined time.

3. A method for transmitting data in a hub-based network to which a plurality of communication devices are connected through a hub in accordance with a communication based on a protocol of CSMA/CD (Carrier Sense Multiple Access with Collision Detection), comprising the steps of:

detecting a destination communication device for each of a plurality of data frames received by said hub based on a destination address in said each data frame, said each data frame having a transmission request from a communication device;

when a plurality of said communication devices have transmission requests for transmitting data to a same destination communication device, relaying by said hub, a data frame from one communication device of said plurality of said communication devices to said same destination communication device;

wherein when a plurality of data frames having a transmission request for said same destination communication device are received from said plurality of communication devices at said hub, if a communication for said same destination communication device is not occupied, transferring, by said hub, a data frame for said same destination communication device of one communication device of said plurality of communication devices, adding, by said hub, a collision signal based on said protocol of CSMA/CD to each of said data frames from said communication devices other than said one communication device, and transmitting, by said hub, said data frames each having said collision signal to said communication devices other than said one communication device, thereby requesting, by said hub, re-transmission of said data frames other than said data frame from said one communication device from said communication devices excluding said one communication device;

and wherein when a plurality of data frames having a transmission request are received at said hub for a communication device, a communication of which is occupied by another communication device, and when receiving a plurality of data frames, having a transmission request for transmitting to said communication device, to be transmitted from said plurality of communication devices, adding by said hub, a collision signal based on said protocol of CSMA/CD to each of said data frames from said plurality of communication devices and transmitting, by said hub, said data frames each having said collision signal to said plurality of communication devices, thereby requesting, by said hub, re-transmission of said data frames from said plurality of communication devices.

4. A method for transmitting data in a hub-based network to which a plurality of communication devices are connected through a hub in accordance with a communication based on a ring-type LAN, comprising the steps of:

detecting a destination communication device for each of a plurality of data frames received by said hub based on a destination address in said each data frame, said each data frame having a transmission request from a communication device;

when a plurality of said communication devices have transmission requests for transmitting data to a same destination communication device, relaying by said hub, a data frame from one communication device of said plurality of said communication devices to said same destination communication device;

wherein when a plurality of data frames having a transmission request for said same destination communication device are received from said plurality of communication devices at said hub, if a communication for said same destination communication device is not occupied, transferring, by said hub, a data frame for said same destination communication device of one communication device of said plurality of communication devices, adding, by said hub, an indication that a failure in switching has occurred to each of said data frames from said plurality of communication devices other than said one communication device, and transmitting, by said hub, said data frames each having said indication to said plurality of communication devices other than said one communication device, thereby requesting, by said hub, re-transmission of said data frames other than said data frame from said one communication device from said plurality of communication devices excluding said one communication device;

and wherein when a plurality of data frames having a transmission request are received at said hub for a communication device, a communication of which is occupied by another communication device, and when receiving a plurality of data frames, having a transmission request for transmitting to said communication device, to be transmitted from said plurality of communication devices, adding, by said hub, an indication that a failure in switching has occurred to each of said data frames from said plurality of communication devices and transmitting, by said hub, said data frames each having said indication to said plurality of communication devices, thereby requesting, by said hub, re-transmission of said data frames from said plurality of communication devices; and starting by said plurality of communication devices transmitting of said data frames again after a predetermined time.

5. A network system comprising:

a plurality of communication devices;

a hub; and a network for connecting said communication devices and said hub, wherein said network is a ring-type LAN forming loop transmission media between each of the communication devices and the hub such that data frames transmitted from each of the communication devices is transmitted to each communication device, wherein the hub determines whether the loop transmission media to be connected with a destination communication device is idle in response to destination information contained in a data frame transmitted from a source communication device, adds information indicating a failure of exchange to the data frame transmitted from said source communication device when the loop transmission media is idle, transmits the data frame having the information indicating the failure of exchange to said source communication device, and connects a loop transmission medium to be connected with said source communication device with a loop transmission medium to be connected with said destination communication device when the loop transmission media is idle, and wherein said source communication device having received the information indicating the failure of exchange retransmits the data frame after a lapse of a predetermined time.

* * * * *